(12) United States Patent
Choi et al.

(10) Patent No.: US 11,926,761 B2
(45) Date of Patent: Mar. 12, 2024

(54) ORGANIC SOLVENT COMPOSITION AND PAINT COMPOSITION INCLUDING THE SAME

(71) Applicants: SK Innovation Co., Ltd., Seoul (KR); SK Geo Centric Co., Ltd., Seoul (KR)

(72) Inventors: Jisun Choi, Daejeon (KR); Joo Pyung Lee, Daejeon (KR); Jaeyoung Park, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 612 days.

(21) Appl. No.: 17/264,490

(22) PCT Filed: Jul. 25, 2019

(86) PCT No.: PCT/KR2019/009223
§ 371 (c)(1),
(2) Date: Jan. 29, 2021

(87) PCT Pub. No.: WO2020/027493
PCT Pub. Date: Feb. 6, 2020

(65) Prior Publication Data
US 2021/0230437 A1 Jul. 29, 2021

(30) Foreign Application Priority Data

Aug. 2, 2018 (KR) .................. 10-2018-0090150
Jun. 21, 2019 (KR) .................. 10-2019-0073858

(51) Int. Cl.
C09D 7/20 (2018.01)
C09D 133/00 (2006.01)
C09D 163/00 (2006.01)

(52) U.S. Cl.
CPC ............. *C09D 7/20* (2018.01); *C09D 133/00* (2013.01); *C09D 163/00* (2013.01)

(58) Field of Classification Search
CPC ............... C08G 18/10; C08G 18/3243; C08G 18/4825; C08G 18/7621; C09D 7/20; C09D 133/00; C09D 163/00; C09D 167/00; C09D 175/02; C09D 175/04; C09J 163/00

See application file for complete search history.

(56) References Cited

FOREIGN PATENT DOCUMENTS

| | | | |
|---|---|---|---|
| CN | 1536038 | A | 10/2004 |
| CN | 1817982 | A | 8/2006 |
| CN | 102015815 | A | 4/2011 |
| CN | 104926611 | A * | 9/2015 |
| CN | 106397210 | A * | 2/2017 |
| JP | H6256715 | A | 9/1994 |
| JP | 2001240787 | A | 9/2001 |
| JP | 2002129090 | A | 5/2002 |
| JP | 2003313562 | A | 11/2003 |
| JP | 200548180 | A | 2/2005 |
| JP | 2005299103 | A | 10/2005 |
| JP | 200622178 | A | 1/2006 |
| JP | 200628395 | A | 2/2006 |
| JP | 200696786 | A | 4/2006 |
| JP | 2006152259 | A | 6/2006 |
| JP | 2006299173 | A | 11/2006 |
| JP | 200792081 | A | 4/2007 |
| JP | 2008214365 | A | 9/2008 |
| JP | 2015196726 | A | 11/2015 |
| JP | 5864678 | B2 | 2/2016 |
| KR | 1999018305 | A | 3/1999 |
| KR | 20030076249 | A | 9/2003 |
| KR | 1020070059705 | A | 6/2007 |
| KR | 101471629 | B1 | 12/2014 |

* cited by examiner

Primary Examiner — Anthony J Green
(74) Attorney, Agent, or Firm — The Webb Law Firm

(57) ABSTRACT

Provided are an organic solvent composition having excellent solvency for and compatibility with a resin, and a paint composition including the same. Specifically, the paint composition including the same is prepared, due to the difference in evaporation rate of the organic solvent composition, the compatibility with the resin may be further improved.

20 Claims, No Drawings

ORGANIC SOLVENT COMPOSITION AND PAINT COMPOSITION INCLUDING THE SAME

CROSS-REFERENCE TO RELATED APPLICATIONS

This application is the United States national phase of International Application No. PCT/KR2019/009223 filed Jul. 25, 2019, and claims priority to Korean Patent Application Nos. 10-2018-0090150 filed Aug. 2, 2018 and 10-2019-0073858 filed Jun. 21, 2019, the disclosures of which are hereby incorporated by reference in their entirety.

BACKGROUND OF THE INVENTION

Field of the Invention

The present invention relates to an organic solvent composition and a paint composition including the same.

Description of Related Art

Various organic solvents have been used as industrial solvents such as paint solvents, cleaning solvents, tackifier/adhesive solvents, tape solvents, synthetic resin solvents, and pharmaceutical reaction solvents.

A conventional paint composition requires a large amount of organic solvents which lower the viscosity of the paint to maintain smooth painting workability due to high viscosity of a resin contained therein. In this case, due to the large amount of organic solvents added to the paint composition, a paint film is formed after coating, and the organic solvents are volatilized into the atmosphere. Such a large amount of volatile organic compounds emitted into the atmosphere are a main cause of air pollution and their use is limited. Such organic solvents are designated as volatile organic compounds and are regulated.

Therefore, use of dimethyl carbonate (DMC) as a volatile organic compound exempt solvent has been proposed. Such dimethyl carbonate is non-toxic as compared to toluene or xylene, which has been conventionally used, does not release of volatile organic compounds, and has a high solvency. Therefore, regulation on volatile organic compounds may be avoided.

However, the dimethyl carbonate is expensive as compared to toluene or xylene, which has been used as conventional organic solvents, and has poor compatibility with the resin contained in the paint composition, so solvency thereof is poor. Therefore, the dimethyl carbonate is not sufficient to replace all of toluene and xylene.

Accordingly, when the organic solvents in which toxic materials are reduced while retaining excellent solvency for the paint composition are developed, they are expected to be useful in related fields.

SUMMARY OF THE INVENTION

An object of the present invention is to provide an organic solvent composition capable of implementing a mixed aniline point having excellent solvency for a resin and having reduced toxicity.

Another object of the present invention is to provide an organic solvent composition having excellent compatibility with the resin and a paint composition including the same.

Technical Solution

In one general aspect, an organic solvent composition includes toluene and a saturated hydrocarbon-based mixture, wherein a volume ratio of the toluene and the saturated hydrocarbon-based mixture in the composition is 6:4 to 8:2, wherein a mixed aniline point is 20 to 40° C., and a content of an alicyclic saturated hydrocarbon is 2 to 19% by volume based on the total volume of the organic solvent composition.

The organic solvent may have the content of a C7 saturated hydrocarbon of 15 to 40% by volume based on the total volume of the organic solvent composition.

The organic solvent may have the content of methylcyclohexane of 0.2 to 9% by volume based on the total volume of the organic solvent composition.

The saturated hydrocarbon-based mixture may have an evaporation rate of 300 to 500 when the evaporation rate of n-butyl acetate (n-BuAc) is set to 100 according to ASTM D3539.

A content ratio of the organic solvent composition may satisfy the following Equation 1 after evaporating 50% by volume based on the total volume of the organic solvent composition at 25° C. and atmospheric pressure:

$$\frac{V_{50}}{V_0} > 1.05 \qquad \text{[Equation 1]}$$

wherein $V_{50}$ is a volume ratio of the toluene after evaporating 50% by volume based on the total volume of the organic solvent composition, and $V_0$ is a volume ratio of the toluene before evaporation.

In another general aspect, a paint composition includes the organic solvent composition as described above, and at least one resin selected from the group consisting of an ester-based resin, a urethane-based resin, a urea-based resin, an epoxy-based resin, and an acryl-based resin.

The paint composition may include 20 to 40% by weight of the organic solvent composition based on the total weight of the paint composition.

The paint composition may further include 50 to 200 parts by weight of at least one solvent selected from the group consisting of an ester-based solvent, an ether-based solvent, and a ketone-based solvent based on 100 parts by weight of the organic solvent composition.

Advantageous Effects

The organic solvent according to an embodiment of the present invention may significantly improve solvency for a resin and may reduce toxicity.

In addition, the organic solvent composition according to an embodiment of the present invention has excellent compatibility with the resin, and when the paint composition including the same is prepared, due to the difference in evaporation rate of the organic solvent composition, the compatibility with the resin may be further improved.

BEST MODE

Hereinafter, the present invention will be described in more detail. The following exemplary embodiments are only a reference for describing the present invention in detail, and the present invention is not limited thereto, and may be implemented in various forms.

In addition, all technical terms and scientific terms have the same meanings as those commonly understood by a person skilled in the art to which the present invention pertains unless otherwise defined. The terms used herein are only for effectively describing a certain exemplary embodiment, and not intended to limit the present invention.

The present invention relates to an organic solvent composition and a paint composition including the same.

The present invention will be described in detail as follows.

The organic solvent according to an embodiment of the present invention includes toluene and a saturated hydrocarbon-based mixture in which a volume ratio of the toluene and the saturated hydrocarbon-based mixture is 6:4 to 8:2, wherein a mixed aniline point is 20 to 40° C., and a content of an alicyclic saturated hydrocarbon is 2 to 19% by volume based on the total volume of the organic solvent composition.

The conventional organic solvent composition has excellent compatibility with a resin, but has strong toxicity, which makes difficult to apply it as a paint composition.

Thus, the organic solvent composition according to the embodiment of the present invention includes the toluene and the saturated hydrocarbon-based mixture mixed in a specific ratio, and includes the content of an alicyclic saturated hydrocarbon within the above range, thereby not only reducing the toxicity but also having excellent solvency for and compatibility with the resin due to a mixed aniline point of 20 to 40° C. In addition, due to the difference in evaporation rate between the toluene and the saturated hydrocarbon-based mixture, the concentration of the toluene is increased during use, such that the organic solvent composition not only improves the solvency for the resin but also has excellent compatibility with the resin, which may be usefully provided as a paint composition.

In the organic solvent composition according to the embodiment of the present invention, a volume ratio of the toluene and the saturated hydrocarbon-based mixture is 6:4 to 8:2. The volume ratio of the toluene and the saturated hydrocarbon-based mixture may be preferably 6.5:3.5 to 7.5:2.5. The volume ratio of the toluene and the saturated hydrocarbon-based mixture may be more preferably 7:3. When included within the above range, the organic solvent composition may not only reduce toxicity but also have excellent solvency for and compatibility with the resin due to a mixed aniline point of 20° C. to 40° C. per se. In addition, due to the difference in the evaporation rate between the toluene and the saturated hydrocarbon-based mixture in the organic solvent composition, the concentration of the toluene may be increased during use, and more excellent solvency for and compatibility with the resin may be obtained.

The organic solvent according to the embodiment of the present invention may have a content of an alicyclic saturated hydrocarbon of 2 to 19% by volume based on the total volume of the organic solvent composition. Specifically, the lower limit may be 2% or 3% by volume, and the upper limit may be 19%, 18%, 17%, 16%, 15%, or 14% by volume. When the alicyclic saturated hydrocarbon is included within the above range, the organic solvent composition may have significantly low toxicity and may have excellent solvency for and compatibility with the resin. In addition, the organic solvent composition is provided for the paint to provide excellent workability in forming a paint film, whereby surface smoothness or the like of the paint film may be improved.

The alicyclic saturated hydrocarbon may be preferably a C6 to C8 alicyclic saturated hydrocarbon, more preferably a C6 to C7 alicyclic saturated hydrocarbon. Specific examples thereof may include one or more selected from ethylcyclopentane, methylcyclohexane, 1,1-dimethylcyclopentane, 1c,3-dimethylcyclopentane, 1t,3-dimethylcyclopentane, 2t,2-dimethylcyclopentane, and cyclohexane.

According to an embodiment of the present invention, the organic solvent composition may have a mixed aniline point of 25 to 35° C., which implements a more excellent solvency.

According to an embodiment of the present invention, the saturated hydrocarbon-based mixture may further include an aliphatic saturated hydrocarbon. The aliphatic saturated hydrocarbon may be a chain type having no side chains or a branched type having side chains.

Specifically, according to an embodiment of the present invention, the saturated hydrocarbon-based mixture may include 0.1 to 5% by volume of a C7 chain aliphatic saturated hydrocarbon, 45 to 60% by volume of a C7 branched aliphatic saturated hydrocarbon, 0.01 to 2% by volume of a C8 branched aliphatic saturated hydrocarbon, 1 to 5% by volume of a C6 alicyclic saturated hydrocarbon, and 35 to 50% by volume of a C7 alicyclic saturated hydrocarbon based on the total volume of the organic solvent composition. The saturated hydrocarbon-based mixture may preferably include, but is not limited thereto, 1 to 5% by volume of a C7 chain aliphatic saturated hydrocarbon, 50 to 60% by volume of a C7 branched aliphatic saturated hydrocarbon, 0.01 to 1% by volume of a C8 branched aliphatic saturated hydrocarbon, 1 to 3% by volume of a C6 alicyclic saturated hydrocarbon, and 35 to 45% by volume of a C7 alicyclic saturated hydrocarbon based on the total volume of the organic solvent composition.

According to an embodiment of the present invention, the saturated hydrocarbon-based mixture may, in another embodiment, include 0.01 to 2% by volume of a C5 chain aliphatic saturated hydrocarbons, 0.01 to 2% by volume of a C6 chain aliphatic saturated hydrocarbons, 3 to 15% by volume of a C7 chain aliphatic saturated hydrocarbons, 0.01 to 2% by volume of a C5 branched aliphatic saturated hydrocarbons, 0.01 to 1% by volume of a C6 branched aliphatic saturated hydrocarbons, 50 to 80% by volume of a C7 branched aliphatic saturated hydrocarbons, 0.01 to 2% by volume of a C8 branched aliphatic saturated hydrocarbons, 1 to 10% by volume of a C6 alicyclic saturated hydrocarbons, 5 to 20% by volume of a C7 alicyclic saturated hydrocarbon, and 0.01 to 2% by volume of a C8 alicyclic saturated hydrocarbon based on the total volume of the organic solvent composition. The saturated hydrocarbon-based mixture may preferably include, but is not limited thereto, 0.01 to 1% by volume of a C5 chain aliphatic saturated hydrocarbons, 0.01 to 1% by volume of a C6 chain aliphatic saturated hydrocarbon, 5 to 15% by volume of a C7 chain aliphatic saturated hydrocarbons, 0.01 to 1% by volume of a C5 branched aliphatic saturated hydrocarbons, 0.01 to 1% by volume of a C6 branched aliphatic saturated hydrocarbons, 60 to 80% by volume of a C7 branched aliphatic saturated hydrocarbons, 0.01 to 1% by volume of a C8 branched aliphatic saturated hydrocarbons, 1 to 10% by volume of a C6 alicyclic saturated hydrocarbons, 5 to 15% by volume of a C7 alicyclic saturated hydrocarbon, and 0.01 to 1% by volume of a C8 alicyclic saturated hydrocarbon based on the total volume of the organic solvent composition.

When included within the above range, it may be mixed with toluene to reduce the toxicity and also to have excellent solvency and compatibility. In addition, when mixed with the toluene, due to the difference in the evaporation rate with toluene, the concentration of the toluene may be increased during use, and more excellent solvency for and compatibility with the resin may be obtained.

According to an embodiment of the present invention, the organic solvent composition may have a content of a C7 saturated hydrocarbon of 15 to 40% by volume based on the total volume of the organic solvent composition. Specifically, the lower limit may be 15%, 16%, 17%, 18%, 19%, or 20% by volume, and the upper limit may be 40%, 39%, 38%, 37%, 36%, 35%, 34%, 33%, 32%, 31%, or 30% by volume. The content of the C7 saturated hydrocarbon may be preferably 20 to 35% by volume. The content of the C7 saturated hydrocarbon may be more preferably 20 to 30% by volume. When the C7 saturated hydrocarbon is included in the above range, not only excellent solvency for and compatibility with the resin may be implemented but also the water content in the solvent may be reduced. In addition, the difference in the evaporation rate with the toluene improves the drying rate and increases the content of the toluene in the organic solvent composition during use, thereby further improving the compatibility.

The C7 saturated hydrocarbon is not particularly limited as long as it is a saturated hydrocarbon having 7 carbon atoms, and specific examples thereof may include one or more selected from 2,2,3-trimethylbutane, 2,2-dimethylpentane, 2,3-dimethylpentane, 2,4-dimethylpentane, 3,3-dimethylpentane, 3-ethylpentane, 2-methylhexane, 3-methylhexane, n-heptane, ethylcyclopentane, methylcyclohexane, 1,1-dimethylcyclopentane, 1c,3-dimethylcyclopentane, 1t,3-dimethylcyclopentane, and 2t,2-dimethylcyclopentane.

According to an embodiment of the present invention, the organic solvent composition may have a content of methylcyclohexane of 0.2 to 9% by volume based on the total volume of the organic solvent composition. Specifically, the lower limit may be 0.2% or 0.3% by volume, and the upper limit may be 9% or 8% by volume. When methylcyclohexane is included in the above range, the organic solvent composition may have excellent solvency for the resin due to a low mixed aniline point, and is excellent in compatibility with a resin. The organic solvent composition also does not cause freezing or the like at a low temperature, and is thus excellent in long-term storage properties.

According to an embodiment of the present invention, the saturated hydrocarbon-based mixture may have an evaporation rate of 300 to 500 when the evaporation rate of n-butyl acetate (n-BuAc) is set to 100 according to ASTM D3539. The evaporation rate may be preferably 350 to 450. When the evaporation rate is as described above, due to the difference in evaporation rate with the toluene, the content of the toluene may be increased during use, and the solvency for and compatibility with the resin may be further improved.

Here, when the evaporation rate of n-butyl acetate (n-BuAc) is set to 100 according to ASTM D3539, the evaporation rate of the toluene is 200.

According to an embodiment of the present invention, a content ratio of the organic solvent composition may satisfy the following Equation 1 after evaporating 50% by volume based on the total volume of the organic solvent composition at 25° C. and atmospheric pressure:

$$\frac{V_{50}}{V_0} > 1.05 \qquad \text{[Equation 1]}$$

wherein $V_{50}$ is a volume ratio of the toluene after evaporating 50% by volume based on the total volume of the organic solvent composition, and $V_0$ is a volume ratio of the toluene before evaporation.

The organic solvent according to the embodiment of the present invention may satisfy Equation 1 as described above by mixing the toluene and the saturated hydrocarbon-based mixture in the solvent in a specific ratio. When Equation 1 is satisfied, the content of the toluene is increased during use, and the solvency may be further improved without lowering the compatibility with the resin.

According to an embodiment of the present invention, the above-mentioned organic solvent composition may be used as a solvent for paint.

According to another embodiment of the present invention, there is provided a paint composition including the organic solvent composition, and at least one resin selected from an ester-based resin, a urethane-based resin, a urea-based resin, an epoxy-based resin, and an acryl-based resin.

According to an embodiment of the present invention, the organic solvent composition may be provided as a paint composition by directly blending with the resin, and may be provided as a paint composition by partially evaporating the saturated hydrocarbon-based mixture in the organic solvent composition and then blending with the resin, but the present invention is not limited thereto. The organic solvent composition according to the embodiment of the present invention has excellent solvency for and compatibility with the resin and is thus provided as a paint composition, thereby obtaining excellent paint film characteristics in forming a paint film.

Here, when the saturated hydrocarbon-based mixture in the organic solvent composition is partially evaporated and then blended with the resin to provide a paint composition as in the latter case, the compatibility with the resin may be further improved.

The resin may specifically be at least one resin selected from a polyester resin, a polyurethane resin, a polyurea resin, an epoxy resin, and an acrylic resin, and is not particularly limited as long as it is a resin containing specific repeating units of the above-mentioned resins such as modified resins of these resins, for example, a polyurethane-urea resin, an epoxy-modified urethane resin, and an epoxy-modified acrylic resin.

According to an embodiment of the present invention, the paint composition may further include a curing agent together with the resin, depending on the resin used, but is not limited thereto.

According to an embodiment of the present invention, the paint composition may include 20 to 40% by weight of the organic solvent composition based on the total weight of the paint composition. The paint composition may preferably include 20 to 35% by weight of the organic solvent composition based on the total weight of the paint composition, but is not limited thereto.

According to an embodiment of the present invention, the paint composition may further include 50 to 200 parts by weight of at least one solvent selected from the group consisting of an ester-based solvent, an ether-based solvent, and a ketone-based solvent based on 100 parts by weight of the organic solvent composition, but is not limited thereto.

Specific examples of the solvent may include one or more mixed solvents selected from a ketone-based solvent selected from methyl isobutyl ketone, methyl isoamyl ketone, methyl amyl ketone, and methyl ethyl ketone; an ether-based solvent selected from tetrahydrofuran, dioxane, ethylene glycol monomethyl ether, ethylene glycol monoethyl ether, ethylene glycol monobutyl ether, ethylene glycol dibutyl ether, diethylene glycol monomethyl ether, and diethylene glycol monoethyl ether; and an ester-based solvent selected from ethyl acetate, propyl acetate, butyl acetate, butyl cellosolve acetate, and propylene glycol methyl ether acetate. The paint composition is also excellent in miscibility with various solvents as described above, and thus may be mixed and provided in various fields, depending on the purpose.

According to an embodiment of the present invention, the paint composition may further include, but not limited thereto, at least one additive selected from the group consisting of defoaming agents, dispersants, high fluidizing agents, anti-settling agents, wetting agents, film forming agents, self-leveling agents, shrinkage reducing agents, and antiseptics.

When the paint composition includes the organic solvent composition as described above, there may be provided a paint composition having not only low toxicity but also excellent compatibility with and solvency for the resin.

The paint composition according to the embodiment of the present invention may apply to various industries such as paints, inks, cleaners, tapes, tackifiers, and adhesives.

As described above, while the present invention has been described in detail with respect to the exemplary embodiments thereof, it will be appreciated by those skilled in the art that various changes can be made therein without departing from the spirit and scope of the invention as defined by the appended claims. Therefore, further modifications in the embodiments of the present invention will not deviate from the technology of the present invention.

[Measurement Method of Physical Properties]

1. Saybolt color

It was measured according to ASTM D1209.

2. Specific gravity (15.56/15.56° C.)

It was measured according to ASTM D4052.

3. Viscosity (cSt @ 40° C.)

It was measured according to ASTM D445.

4. Mixed aniline point

It was measured according to ASTM D611.

5. Distillation range (IBP-DP)

The range from an initial boiling point (IBP) to a drying point (DP) was measured according to ASTM D850.

6. Evaporation rate

It was measured according to ASTM D3539.

7. Drying rate 5 phr of an organic solvent composition prepared from examples and comparative examples was added to 100 parts by weight of a mixture of 30% by volume of a urethane base (toluene diisocyanate-polypropylene glycol-toluene diisocyanate, TDI-PPG-TDI prepolymer) and 70% by volume of a curing agent (4,4'-methylenebis-2-chlorobenzene amine, MOCA), and mixed, and then the mixture was coated on a substrate to a thickness of 1 mm to confirm the drying rate at 25° C. and normal pressure. Depending on the weight loss rate over time, they are classified as follows: ⊚: very excellent, ○: excellent, and X: inferior.

The saturated hydrocarbon-based mixture according to the embodiment of the present invention is measured by GC-DHA (ASTM D6730), and the contents of an aliphatic saturated hydrocarbon, an alicyclic saturated hydrocarbon, a C7, and a methylcyclohexane are shown in Table 1 based on the total content of the saturated hydrocarbon-based mixture.

TABLE 1

|  |  | Carbon number | First saturated hydrocarbon-based mixture Vol % | Second saturated hydrocarbon-based mixture Vol % |
|---|---|---|---|---|
| Content of aliphatic saturated hydrocarbon | Chain type | C5 | — | 0.32 |
|  |  | C6 | — | 0.40 |
|  |  | C7 | 3.15 | 7.94 |
|  |  | C8 | — | — |
|  | Branched type | C5 | — | 0.02 |
|  |  | C6 | — | 0.23 |
|  |  | C7 | 57.02 | 75.5 |
|  |  | C8 | 0.08 | 0.13 |
| Content of alicyclic saturated hydrocarbon |  | C6 | 2.55 | 5.87 |
|  |  | C7 | 37.20 | 9.45 |
|  |  | C8 | — | 0.14 |
| Content of C7 |  |  | 97.37 | 92.82 |
| Content of methylcyclohexane |  |  | 18.05 | 1.89 |

Example 1

30% by volume of the first saturated hydrocarbon-based mixture (evaporation rate=400, compared to the standard of n-BuAc=100) mixed in the contents of Table 1 and 70% by volume of the toluene (evaporation rate=200, compared to the standard of n-BuAc=100) were mixed.

Example 2

The present example was carried out in the same manner as in Example 1 except that 20% by volume of the first saturated hydrocarbon-based mixture and 80% by volume of the toluene were mixed.

Example 3

The present example was carried out in the same manner as in Example 1 except that 40% by volume of the first saturated hydrocarbon-based mixture and 60% by volume of the toluene were mixed.

Example 4

30% by volume of the second saturated hydrocarbon-based mixture (evaporation rate=380, compared to the standard of n-BuAc=100) mixed in the contents of Table 1 and 70% by volume of the toluene (evaporation rate=200, compared to the standard of n-BuAc=100) were mixed.

Example 5

20% by volume of the second saturated hydrocarbon-based mixture mixed in the contents of Table 1 and 80% by volume of the toluene were mixed.

Example 6

40% by volume of the second saturated hydrocarbon-based mixture mixed in the contents of Table 1 and 60% by volume of the toluene were mixed.

Comparative Example 1

An organic solvent composed of 100% by volume of the toluene was used.

Comparative Example 2

An organic solvent composed of the first saturated hydrocarbon-based mixture mixed in the contents of Table 1 was used.

Comparative Example 3

The present example was carried out in the same manner as in Example 1 except that 10% by volume of the first saturated hydrocarbon-based mixture and 90% by volume of the toluene were mixed.

Comparative Example 4

The present example was carried out in the same manner as in Example 1 except that 50% by volume of the first saturated hydrocarbon-based mixture and 50% by volume of the toluene were mixed.

Comparative Example 5

An organic solvent composed of the second saturated hydrocarbon-based mixture mixed in the contents of Table 1 was used.

Comparative Example 6

The present example was carried out in the same manner as in Example 1 except that 10% by volume of the second saturated hydrocarbon-based mixture and 90% by volume of the toluene were mixed.

Comparative Example 7

The present example was carried out in the same manner as in Example 1 except that 50% by volume of the second saturated hydrocarbon-based mixture and 50% by volume of the toluene were mixed.

The mixing ratios of the toluene and the saturated hydrocarbon-based mixture in the compositions of the organic solvent compositions prepared from Examples 1 to 6 and Comparative Examples 1 to 7 are shown in Table 2 below. In addition, the contents of a C7 saturated hydrocarbon (C7), an alicyclic saturated hydrocarbon, and a methylcyclohexane based on the total volume of the organic solvent composition are shown in Table 2 below.

TABLE 2

| | Mixing ratio of toluene (vol %) | Mixing ratio of saturated hydrocarbon-based mixture (vol %) | Content of C7 (vol %) | Content of alicyclic saturated hydrocarbon (vol %) | Content of methylcyclohexane (vol %) |
|---|---|---|---|---|---|
| Example 1 | 70 | 30 | 29.21 | 11.93 | 5.42 |
| Example 2 | 80 | 20 | 19.47 | 8.00 | 3.61 |
| Example 3 | 60 | 40 | 38.95 | 15.90 | 7.22 |
| Example 4 | 70 | 30 | 27.87 | 4.64 | 0.57 |
| Example 5 | 80 | 20 | 18.58 | 3.09 | 0.38 |
| Example 6 | 60 | 40 | 37.16 | 6.18 | 0.76 |
| Comparative Example 1 | 100 | — | 0 | 0 | 0 |
| Comparative Example 2 | — | 100 | 97.37 | 39.75 | 18.05 |
| Comparative Example 3 | 90 | 10 | 9.74 | 3.98 | 1.81 |
| Comparative Example 4 | 50 | 50 | 48.69 | 19.88 | 9.03 |
| Comparative Example 5 | — | 100 | 92.89 | 15.46 | 1.89 |
| Comparative Example 6 | 90 | 10 | 9.29 | 1.55 | 0.19 |
| Comparative Example 7 | 50 | 50 | 46.45 | 7.73 | 0.95 |

The physical properties of the organic solvent compositions prepared from Examples 1 to 6 and Comparative Examples 1 to 7 were measured, and the compatibility was confirmed by blending with the polyurethane resin. The results are shown in Table 3 below.

For compatibility, 2 phr of the urethane base and the curing agent were added to 100 parts by weight of the organic solvent composition, and then the degree of dispersion of the solution was visually inspected and classified as follows: ◎: very excellent, ○: excellent, and X: inferior.

The urethane base and the curing agent used herein were mixed with 30% by volume of the urethane base (toluene diisocyanate-polypropylene glycol-toluene diisocyanate, TDI-PPG-TDI prepolymer) and 70% by volume of the curing agent (4,4'-methylenebis-2-chlorobenzene amine, MOCA) to confirm the compatibility.

TABLE 3

| | Saybolt color | Viscosity (cSt @ 40° C.) | Mixed aniline point (° C.) | Distillation range | Drying rate | Compatibility |
|---|---|---|---|---|---|---|
| Example 1 | +30 | 0.61 | 31 | 100~110 | ◎ | ◎ |
| Example 2 | +30 | 0.62 | 24 | 101~112 | ◎ | ○ |
| Example 3 | +30 | 0.60 | 37 | 96~110 | ◎ | ○ |
| Example 4 | +30 | 0.60 | 28 | 93~113 | ◎ | ○ |
| Example 5 | +30 | 0.61 | 23 | 95~115 | ◎ | ○ |
| Example 6 | +30 | 0.60 | 30 | 98~116 | ◎ | ○ |
| Comparative Example 1 | +30 | 0.66 | 10 | 110 | ○ | ◎ |
| Comparative Example 2 | +30 | 0.62 | 65 | 91~95 | ◎ | X |
| Comparative Example 3 | +30 | 0.63 | 19 | 100~110 | ○ | ◎ |
| Comparative Example 4 | +30 | 0.60 | 41 | 95~110 | ◎ | X |
| Comparative Example 5 | +30 | 0.61 | 56 | 90~94 | ◎ | X |
| Comparative Example 6 | +30 | 0.62 | 15 | 93~112 | ○ | ◎ |
| Comparative Example 7 | +30 | 0.60 | 36 | 90~110 | ◎ | X |

As shown in Table 3, it could be confirmed that the organic solvent composition prepared in the examples according to the embodiment of the present invention was transparent in color, had low toxicity by mixing the toluene and the saturated hydrocarbon-based mixture, and had a mixed aniline point of 20 to 40° C. even as a mixture, and thus had excellent solvency.

In addition, it was confirmed that due to the difference in the evaporation rate of the toluene and the saturated hydrocarbon-based mixture, the content of the toluene was increased during use, thereby manifesting a further improved solvency for the resin. It was confirmed that the examples according to the embodiment of the present invention satisfy Equation 1.

In addition, it was confirmed that when the content of the alicyclic saturated hydrocarbon was 2 to 19% by volume as in Examples 1 to 6, the organic solvent composition had low toxicity and an excellent solvency for the resin as compared to Comparative Example 6, had excellent solvency for and compatibility with the resin as compared to Comparative Example 4, and is excellent in workability in formation of the paint film and thus the surface smoothness of the paint film is excellent.

When toluene alone was used as in Comparative Example 1, the compatibility with the resin was excellent, but it was toxic and difficult to use in a paint composition. In comparison with the above, it was confirmed that the organic solvent compositions prepared from Examples 1 to 6 were not only excellent in the compatibility with the resin but also had low toxicity.

In addition, it was confirmed that when using only the saturated hydrocarbon-based mixture as in Comparative Examples 2 and 5, not only the solvency for the resin was poor but also the compatibility with the resin was significantly reduced as compared to Examples 1 to 6.

As in Examples 1 to 6, when the content of the C7 saturated hydrocarbon was 15 to 40% by volume, the solvency for and compatibility with the resin was excellent as compared to Comparative Examples 3, 4, 6 and 7, the drying rate was excellent due to the difference in evaporation rate between the toluene and the saturated hydrocarbon-based mixture. Thus, the content of the toluene in the organic solvent composition may be increased during use to further improve the compatibility. Further, it was confirmed that when the content of the C7 saturated hydrocarbon was 20 to 35% by volume, more specifically 20 to 30% by volume as in Examples 1 to 4, the solvency for and compatibility with the resin were further improved.

In addition, it was confirmed that when the content of the methylcyclohexane was 0.2 to 8% by volume as in Examples 1 to 6, the solvency for the resin may be further improved.

In addition, when the toluene and the saturated hydrocarbon-based mixture were mixed in the ratios of Comparative Examples 3 and 6, it is excellent in compatibility with a resin, but takes a long time to dry and has toxicity, which makes it difficult to use the paint composition.

In addition, when the toluene and the saturated hydrocarbon-based mixture were mixed in the ratios of Comparative Examples 4 and 7, the compatibility with the resin was significantly reduced, which makes it difficult to work the paint film.

Thus, the organic solvent composition according to the embodiment of the present invention may reduce toxicity as compared to conventional toluene, and may be further improved beyond satisfying the physical properties required for toluene, and thus may be widely used in industrial fields such as paints, inks, and adhesives.

Hereinabove, although the organic solvent composition and the paint composition including the same have been described in the present invention through specific matters and limited examples, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned exemplary embodiments, but the claims and all of the modifications equal or equivalent to the claims are intended to fall within the scopes and spirits of the present invention.

The invention claimed is:

1. An organic solvent composition comprising:
toluene; and
a saturated hydrocarbon-based mixture,
wherein a volume ratio of the toluene and the saturated hydrocarbon-based mixture is 6:4 to 8:2 in the composition, and
wherein a mixed aniline point is 20 to 40° C., and a content of an alicyclic saturated hydrocarbon is 2 to 19% by volume based on the total volume of the composition.

2. The organic solvent of claim 1, wherein a content of a C7 saturated hydrocarbon is 15 to 40% by volume.

3. The organic solvent of claim 1, wherein a content of methylcyclohexane is 0.2 to 9% by volume.

4. The organic solvent of claim 1, wherein the saturated hydrocarbon-based mixture has an evaporation rate of 300 to 500 when the evaporation rate of n-butyl acetate (n-BuAc) is set to 100 according to ASTM D3539.

5. The organic solvent of claim 1, wherein a content ratio of the organic solvent composition satisfies the following Equation 1 after evaporating 50% by volume based on the total volume of the organic solvent composition at 25° C. and atmospheric pressure:

$$\frac{V_{50}}{V_0} > 1.05 \qquad [\text{Equation 1}]$$

wherein
$V_{50}$ is a volume ratio of the toluene after evaporating 50% by volume based on the total volume of the organic solvent composition, and
$V_0$ is a volume ratio of the toluene before evaporation.

6. A paint composition comprising the organic solvent composition of claim 1 and at least one resin selected from the group consisting of an ester-based resin, a urethane-based resin, a urea-based resin, an epoxy-based resin, and an acryl-based resin.

7. The paint composition of claim 6, comprising 20 to 40% by weight of the organic solvent composition based on the total weight of the paint composition.

8. The paint composition of claim 6, further comprising 50 to 200 parts by weight of at least one solvent selected from the group consisting of an ester-based solvent, an ether-based solvent, and a ketone-based solvent based on 100 parts by weight of the paint composition.

9. A paint composition comprising the organic solvent composition of claim 2 and at least one resin selected from the group consisting of an ester-based resin, a urethane-based resin, a urea-based resin, an epoxy-based resin, and an acryl-based resin.

10. The paint composition of claim 9, comprising 20 to 40% by weight of the organic solvent composition based on the total weight of the paint composition.

11. The paint composition of claim 9, further comprising 50 to 200 parts by weight of at least one solvent selected from the group consisting of an ester-based solvent, an ether-based solvent, and a ketone-based solvent based on 100 parts by weight of the paint composition.

12. A paint composition comprising the organic solvent composition of claim 3 and at least one resin selected from the group consisting of an ester-based resin, a urethane-based resin, a urea-based resin, an epoxy-based resin, and an acryl-based resin.

13. The paint composition of claim 12, comprising 20 to 40% by weight of the organic solvent composition based on the total weight of the paint composition.

14. The paint composition of claim 12, further comprising 50 to 200 parts by weight of at least one solvent selected from the group consisting of an ester-based solvent, an ether-based solvent, and a ketone-based solvent based on 100 parts by weight of the paint composition.

15. A paint composition comprising the organic solvent composition of claim 4 and at least one resin selected from the group consisting of an ester-based resin, a urethane-based resin, a urea-based resin, an epoxy-based resin, and an acryl-based resin.

16. The paint composition of claim 15, comprising 20 to 40% by weight of the organic solvent composition based on the total weight of the paint composition.

17. The paint composition of claim 15, further comprising 50 to 200 parts by weight of at least one solvent selected from the group consisting of an ester-based solvent, an ether-based solvent, and a ketone-based solvent based on 100 parts by weight of the paint composition.

18. A paint composition comprising the organic solvent composition of claim 5 and at least one resin selected from the group consisting of an ester-based resin, a urethane-based resin, a urea-based resin, an epoxy-based resin, and an acryl-based resin.

19. The paint composition of claim 18, comprising 20 to 40% by weight of the organic solvent composition based on the total weight of the paint composition.

20. The paint composition of claim 18, further comprising 50 to 200 parts by weight of at least one solvent selected from the group consisting of an ester-based solvent, an ether-based solvent, and a ketone-based solvent based on 100 parts by weight of the paint composition.

\* \* \* \* \*

UNITED STATES PATENT AND TRADEMARK OFFICE
CERTIFICATE OF CORRECTION

PATENT NO. : 11,926,761 B2
APPLICATION NO. : 17/264490
DATED : March 12, 2024
INVENTOR(S) : Jisun Choi et al.

It is certified that error appears in the above-identified patent and that said Letters Patent is hereby corrected as shown below:

In the Claims

Column 12, Line 21, Claim 2, after "solvent" insert -- composition --

Column 12, Line 23, Claim 3, after "solvent" insert -- composition --

Column 12, Line 25, Claim 4, after "solvent" insert -- composition --

Column 12, Line 29, Claim 5, after "solvent" insert -- composition --

Signed and Sealed this
Seventh Day of May, 2024

Katherine Kelly Vidal
*Director of the United States Patent and Trademark Office*